US009760085B2

(12) United States Patent
Yamada et al.

(10) Patent No.: US 9,760,085 B2
(45) Date of Patent: Sep. 12, 2017

(54) PRODUCTION SUPPORT SYSTEM, PRODUCTION SUPPORT METHOD, AND PRODUCTION SUPPORT PROGRAM

(71) Applicant: Kabushiki Kaisha Toshiba, Minato-ku (JP)

(72) Inventors: Muneyoshi Yamada, Tokyo (JP); Akira Soga, Tokyo (JP); Atsushi Itoh, Mie-ken (JP); Yuuji Fujita, Mie-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 696 days.

(21) Appl. No.: 14/203,822

(22) Filed: Mar. 11, 2014

(65) Prior Publication Data

US 2015/0081241 A1 Mar. 19, 2015

(30) Foreign Application Priority Data

Sep. 19, 2013 (JP) .................................. 2013-194715

(51) Int. Cl.
*G01N 37/00* (2006.01)
*G05B 19/418* (2006.01)

(52) U.S. Cl.
CPC ........ *G05B 19/41875* (2013.01); *Y02P 90/20* (2015.11); *Y02P 90/22* (2015.11); *Y02P 90/30* (2015.11)

(58) Field of Classification Search
CPC ... G05B 11/32; G05B 19/41875; Y02P 90/20; Y02P 90/22; Y02P 90/30
See application file for complete search history.

(56) References Cited

U.S. PATENT DOCUMENTS

| 2006/0047356 | A1* | 3/2006 | Funk | G05B 19/41865 700/121 |
| 2007/0282549 | A1* | 12/2007 | Behm | G05B 19/41865 702/83 |
| 2008/0183312 | A1* | 7/2008 | Funk | G05B 19/41865 700/45 |
| 2012/0022679 | A1* | 1/2012 | Choi | G03F 7/70525 700/108 |

FOREIGN PATENT DOCUMENTS

JP 2010-258356 A 11/2010

* cited by examiner

*Primary Examiner* — Matthew G Marini
(74) *Attorney, Agent, or Firm* — Oblon, McClelland, Maier & Neustadt, L.L.P.

(57) ABSTRACT

According to one embodiment, a production support system includes: a production information storage unit; a manufacturing apparatus information storage unit; an inspection/measurement apparatus information storage unit; a planned lot number calculation unit; a first control mode calculation unit. The first control mode calculation unit is configured to calculate an appropriate control mode from the number of products to be subjected to the control of the final quality, a relationship between fluctuation of the final quality and a number of products when performing a predetermined feedback type/feedforward type combined APC, fluctuation of the final quality when performing a feedforward type APC, and fluctuation of the final quality when not performing the feedback type/feedforward type combined APC.

2 Claims, 3 Drawing Sheets

PRODUCTION SUPPORT SYSTEM, PRODUCTION SUPPORT METHOD, AND PRODUCTION SUPPORT PROGRAM

CROSS-REFERENCE TO RELATED APPLICATIONS

This application is based upon and claims the benefit of priority from Japanese Patent Application No. 2013-194715, filed on Sep. 19, 2013; the entire contents of which are incorporated herein by reference.

FIELD

Embodiments described herein relate generally to a production support system, a production support method, and a production support program.

BACKGROUND

The control of the final quality of products has become more stringent in recent years. For example, the control of dimensions after process patterning is becoming extremely stringent as downscaling progresses in the manufacturing of electronic devices such as semiconductor devices, etc.

Here, APC (Advanced Process Control) is known as a technology for controlling the final quality of the product in the mass production stage.

The final quality of the product can be uniform within a constant level by using APC to adjust the operation conditions of the manufacturing apparatuses.

However, generally, the effects (suppressing dimensional fluctuation, increasing the process capability, etc.) of APC are maximized when the production volume is high (e.g., in full production).

Therefore, conversely, there is a risk that the fluctuation of the final quality of the product may increase when the production volume is low (e.g., when starting mass production of a new product to change product generations, when reducing production of an old product to change product generations, etc.).

DETAILED DESCRIPTION

Figure 1:
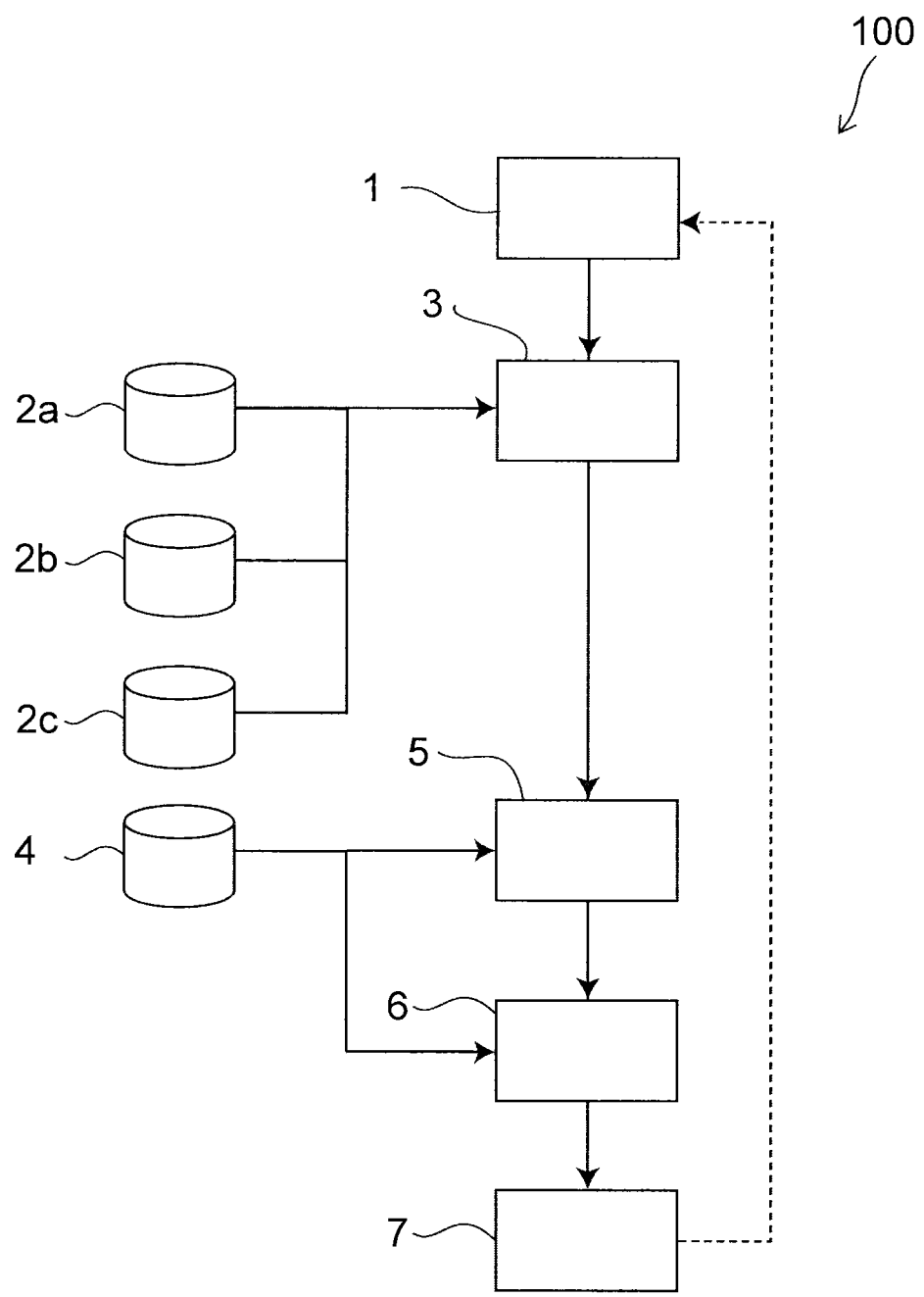
FIG. 1 is a block diagram showing a production support system according to a first embodiment.

In general, according to one embodiment, a production support system includes: a production information storage unit configured to store data relating to a production volume; a manufacturing apparatus information storage unit configured to store data relating to a manufacturing apparatus; an inspection/measurement apparatus information storage unit configured to store data relating to an inspection apparatus or measurement apparatus; a planned lot number calculation unit configured to calculate a planned production volume per manufacturing apparatus from the data relating to the production volume and the data relating to the manufacturing apparatus, calculate an inspection and/or measurement rate from the data relating to the production volume and the data relating to the inspection apparatus or measurement apparatus, and calculate a number of products to be subjected to control of the final quality from the planned production volume per manufacturing apparatus and the inspection and/or measurement rate; and a first control mode calculation unit configured to calculate an appropriate control mode from the number of products to be subjected to the control of the final quality, a relationship between fluctuation of the final quality and a number of products when performing a predetermined feedback type/feedforward type combined APC, fluctuation of the final quality when performing a feedforward type APC, and fluctuation of the final quality when not performing the feedback type/feedforward type combined APC.

Embodiments will now be described with reference to the drawings. Similar components in the drawings are marked with like reference numerals, and a detailed description is omitted as appropriate.

First Embodiment

FIG. 1 is a block diagram showing a production support system 100 according to a first embodiment.

As shown in FIG. 1, an input unit 1, a production information storage unit 2a, a manufacturing apparatus information storage unit 2b, an inspection/measurement apparatus information storage unit 2c, a planned lot number calculation unit 3, a final quality information storage unit 4, a control mode calculation unit 5 (corresponding to an example of a first control mode calculation unit), a control information calculation unit 6, and an output unit 7 are provided in the production support system 100.

The input unit 1 is a unit for inputting data for designating the product to be produced and data relating to constraint conditions.

The data for designating the product to be produced is, for example, the product type, the processes, the production period, the process conditions, etc.

The data relating to the constraint conditions is described below.

The input unit 1 may be a unit that inputs the data or may be a unit that inputs by selecting a displayed data name, etc.

For example, the input unit 1 may be various data input devices such as a keyboard, a barcode reader, etc., a unit that includes a display unit and selection switches, etc.

The input unit 1 provides the input data to the planned lot number calculation unit 3.

The production information storage unit 2a stores data relating to past actual production results and data of the production planning for each product.

The data relating to the past actual production results may be, for example, the past production volume for each product, etc.

The data of the production planning may be, for example, the production volume for each product that is currently in production or for which production will be newly started, etc.

The production information storage unit 2a provides the stored data to the planned lot number calculation unit 3.

The manufacturing apparatus information storage unit 2b stores data relating to the manufacturing apparatuses.

The data relating to the manufacturing apparatuses may be, for example, the number of manufacturing apparatuses provided in the manufacturing line (e.g., the number of apparatuses, the number of processing chambers, etc.), the types of manufacturing apparatuses (e.g., the etching apparatuses, the film formation apparatuses, etc.), the processing capability of each manufacturing apparatus (e.g., the time necessary for processing, etc.), and the like.

The manufacturing apparatus information storage unit 2b provides the stored data to the planned lot number calculation unit 3.

The inspection/measurement apparatus information storage unit 2c stores data relating to inspection apparatuses or measurement apparatuses.

The data relating to the inspection apparatuses or measurement apparatuses may be, for example, the number of inspection apparatuses or measurement apparatuses provided in the manufacturing line, the types of inspection apparatuses or measurement apparatuses, the inspection capability of the inspection apparatuses or the measurement capability of the measurement apparatuses (e.g., the time necessary for inspecting or measuring, etc.), and the like.

The inspection apparatus or the measurement apparatus may inspect or measure the final quality of the product such as, for example, the dimensions, configuration, weight, reflected light intensity, light emission intensity, etc., of the product.

The inspection/measurement apparatus information storage unit 2c provides the stored data to the planned lot number calculation unit 3.

The planned lot number calculation unit 3 determines the number of products to be subjected to the control of the final quality as follows.

First, the planned lot number calculation unit 3 extracts the production volume of the desired product from the data stored in the production information storage unit 2a based on the data input from the input unit 1.

In such a case, the planned lot number calculation unit 3 extracts the planned production volume of the desired product from the data of the production planning if the data of the production planning is stored in the production information storage unit 2a.

If the data of the production planning is not stored in the production information storage unit 2a, the planned lot number calculation unit 3 extracts the planned production volume of the desired product from data relating to past actual production results.

Then, the planned lot number calculation unit 3 extracts the number of manufacturing apparatuses and/or the processing capability of the manufacturing apparatuses from the data stored in the manufacturing apparatus information storage unit 2b based on the data input from the input unit 1.

Continuing, the planned lot number calculation unit 3 determines the planned production volume per manufacturing apparatus (processing chamber) from the planned production volume of the product, the number of manufacturing apparatuses (the number of processing chambers), and the processing capability of the manufacturing apparatuses that are extracted.

Then, the planned lot number calculation unit 3 extracts the number of inspection apparatuses or measurement apparatuses and the inspection capability of the inspection apparatuses or the measurement capability of the measurement apparatuses from the data stored in the inspection/measurement apparatus information storage unit 2c based on the data input from the input unit 1.

Continuing, the planned lot number calculation unit 3 determines the inspection and/or measurement rate (the inspection and measurement frequency) from the planned production volume of the product, the number of inspection apparatuses or measurement apparatuses, and the inspection capability of the inspection apparatuses or the measurement capability of the measurement apparatuses that are extracted.

In such a case, if the number of inspection apparatuses and/or measurement apparatuses is high or the inspection capability of the inspection apparatuses and/or the measurement capability of the measurement apparatuses is high, the inspection and/or measurement of all of the products is performed. Then, the control of the final quality is performed for all of the products.

On the other hand, in the case where the number of inspection apparatuses and/or measurement apparatuses is low or the inspection capability of the inspection apparatuses and/or the measurement capability of the measurement apparatuses is low, the inspection and/or measurement of some of the products is performed. Then, the control of the final quality is performed for the products for which the inspection and/or measurement is performed.

To this end, the planned lot number calculation unit 3 determines a number N of products to be subjected to the control of the final quality based on the following Formula (I).

$$N = n \times S \quad (1)$$

Here, N is the number of products to be subjected to the control of the final quality. The planned production volume per manufacturing apparatus (processing chamber) is n. S is the inspection and/or measurement rate.

In the embodiment of the specification, for example, the number N of products to be subjected to the control of the final quality is the number of products or the production volume per manufacturing apparatus (processing chamber) (the number of products processed in each manufacturing apparatus (each processing chamber) within a constant interval) when performing the APC. The planned lot number calculation unit 3 provides the determined number N of products to be subjected to the control of the final quality to the control mode calculation unit 5.

The final quality information storage unit 4 stores data relating to the final quality for each product.

The data relating to the final quality may be, for example, the relationship between the fluctuation of the final quality and the number of products when performing a feedback type/feedforward type combined APC for each manufacturing apparatus (each processing chamber).

The data relating to the final quality may include, for example, fluctuation $C_1$ of the final quality when performing the feedforward type APC and fluctuation $C_2$ of the final quality when not performing the feedback type/feedforward type combined APC.

The final quality information storage unit 4 provides the stored data to the control mode calculation unit 5 and the control information calculation unit 6.

The control mode calculation unit 5 calculates the appropriate control mode from the number N of products to be subjected to the control of the final quality, the relationship between the fluctuation of the final quality and the number of products when performing the feedback type/feedforward type combined APC for each manufacturing apparatus (each processing chamber), the fluctuation $C_1$ of the final quality when performing the feedforward type APC, and the fluctuation $C_2$ of the final quality when not performing the feedback type/feedforward type combined APC.

Figure 2:
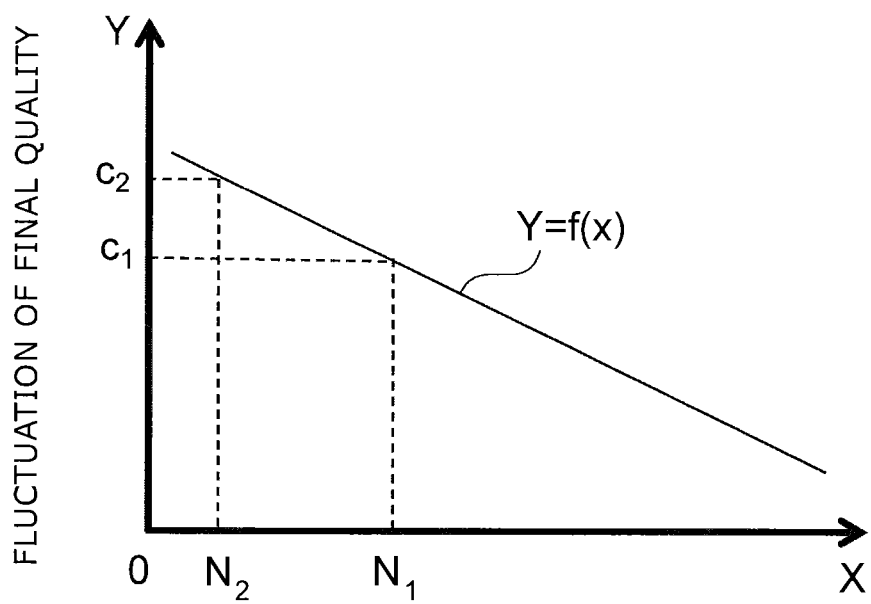
FIG. 2 is a schematic graph showing a selection of a control mode by a control mode calculation unit.

FIG. 2 is a schematic graph showing the selection of the control mode by the control mode calculation unit 5.

In the drawing, Y=f(X) is the relational expression of the relationship between the fluctuation of the final quality and the number of products when performing the feedback type/feedforward type combined APC for each manufacturing apparatus (each processing chamber).

$Y=f(X)$ may be determined by, for example, performing a simulation using data of actual results of the same product, a similar product, etc.

Although a linear $Y=f(X)$ is shown in FIG. 2, this is not limited thereto.

The fluctuation $C_1$ of the final quality when performing the feedforward type APC and the fluctuation $C_2$ of the final quality when not performing the feedback type/feedforward type combined APC may be determined from past actual results.

First, the control mode calculation unit 5 determines a number $N_1$ of products from $Y=f(X)$ and the fluctuation $C_1$ of the final quality.

Also, the control mode calculation unit 5 determines a number $N_2$ of products from $Y=f(X)$ and the fluctuation $C_2$ of the final quality.

A predetermined number $N_1$ of products and a predetermined number $N_2$ of products may be stored in the final quality information storage unit 4.

Here, between 0 and $N_2$, the fluctuation of the final quality is greater than $C_2$. In other words, performing the feedback type/feedforward type combined APC between 0 and $N_2$ conversely causes the fluctuation of the final quality to increase. Therefore, between 0 and $N_2$, it is appropriate not to perform the feedback type/feedforward type combined APC. In such a case, it is sufficient to perform the production using the operation conditions of each manufacturing apparatus (each processing chamber) determined from the data of actual results, etc.

Between $N_2$ and $N_1$, the fluctuation of the final quality is greater than $C_1$. In other words, performing the feedback type/feedforward type combined APC between $N_2$ and $N_1$ conversely causes the fluctuation of the final quality to increase.

In other words, between $N_2$ and $N_1$, it is appropriate to perform the feedforward type APC.

In the case where $N_1$ is exceeded, it is appropriate to perform the feedback type/feedforward type combined APC.

Therefore, the control mode calculation unit 5 can select the appropriate control mode by determining whether the number N of products to be subjected to the control of the final quality is within the range of 0 to $N_2$, the range of $N_2$ to $N_1$, or the range exceeding $N_1$.

The control information calculation unit 6 determines the effects of the APC, e.g., the fluctuation of the final quality and/or the process capability, from the number N of products to be subjected to the control of the final quality and the relationship (e.g., $Y=f(X)$) between the fluctuation of the final quality and the number of products when performing the feedback type/feedforward type combined APC for each manufacturing apparatus (each processing chamber).

The process capability may be, for example, the number of manufacturing apparatuses, the production volume per manufacturing apparatus, the number of inspection apparatuses, the inspection rate, the number N of products to be subjected to the control of the final quality, the method of APC (feedback type APC or feedforward type APC), the anticipated process capability, etc.

The process capability indicates the size of the fluctuation in the current state relative to the width of the specification values and may be used such that a larger numerical value indicates superior manufacturing processes.

The output unit 7 outputs the various data that is used and the results that are determined by the planned lot number calculation unit 3, the control mode calculation unit 5, and the control information calculation unit 6.

The output unit 7 outputs, for example, the number of manufacturing apparatuses, the production volume per manufacturing apparatus, the number of inspection apparatuses, the number of measurement apparatuses, the inspection and/or measurement rate, the number N of products to be subjected to the control of the final quality, the method of APC (feedback type APC or feedforward type APC), the anticipated process capability, etc.

The output destination may be, for example, a display device used by the operator, various data storage media such as a HDD (Hard Disk Drive), flash memory, a floppy disk, etc.

Also, it is possible to re-perform the calculations by inputting the data relating to the constraint conditions to the input unit 1 by referring to the data output by the output unit 7, etc.

The data relating to the constraint conditions may be, for example, the range of the number of manufacturing apparatuses, the range of the amount of processing per manufacturing apparatus, the range of the number of inspection apparatuses or measurement apparatuses, the range of the inspection and/or measurement rate, etc.

When the data relating to the constraint conditions is input from the input unit 1, the data that is input is used preferentially instead of the data stored in the manufacturing apparatus information storage unit 2b, the data stored in the inspection/measurement apparatus information storage unit 2c, the inspection and/or measurement rate determined by the planned lot number calculation unit 3, etc.

In such a case, it is also possible to input data of a prescribed range from the input unit 1. When the data of the prescribed range is input from the input unit 1, condition setting is performed automatically within the ranges; and the calculations described above may be multiply repeated (loop processing). Then, the top N results of the multiple results that are obtained may be output by the output unit 7.

As described above, the production support method according to the embodiment may include the following processes:

a process of calculating the planned production volume per manufacturing apparatus from the data relating to the production volume and the data relating to the manufacturing apparatuses;

a process of calculating the inspection and/or measurement rate from the data relating to the production volume and the data relating to the inspection apparatuses or measurement apparatuses;

a process of calculating the number of products to be subjected to the control of the final quality from the planned production volume per manufacturing apparatus and the inspection and/or measurement rate; and a process of calculating an appropriate control mode from the number of products to be subjected to the control of the final quality, the relationship between the fluctuation of the final quality and the number of products when performing the predetermined feedback type/feedforward type combined APC, the fluctuation of the final quality when performing the feedforward type APC, and the fluctuation of the final quality when not performing the feedback type/feedforward type combined APC.

The content of each of the processes may be similar to those described above. Therefore, a description of the content of each of the processes is omitted.

Second Embodiment

Figure 3:
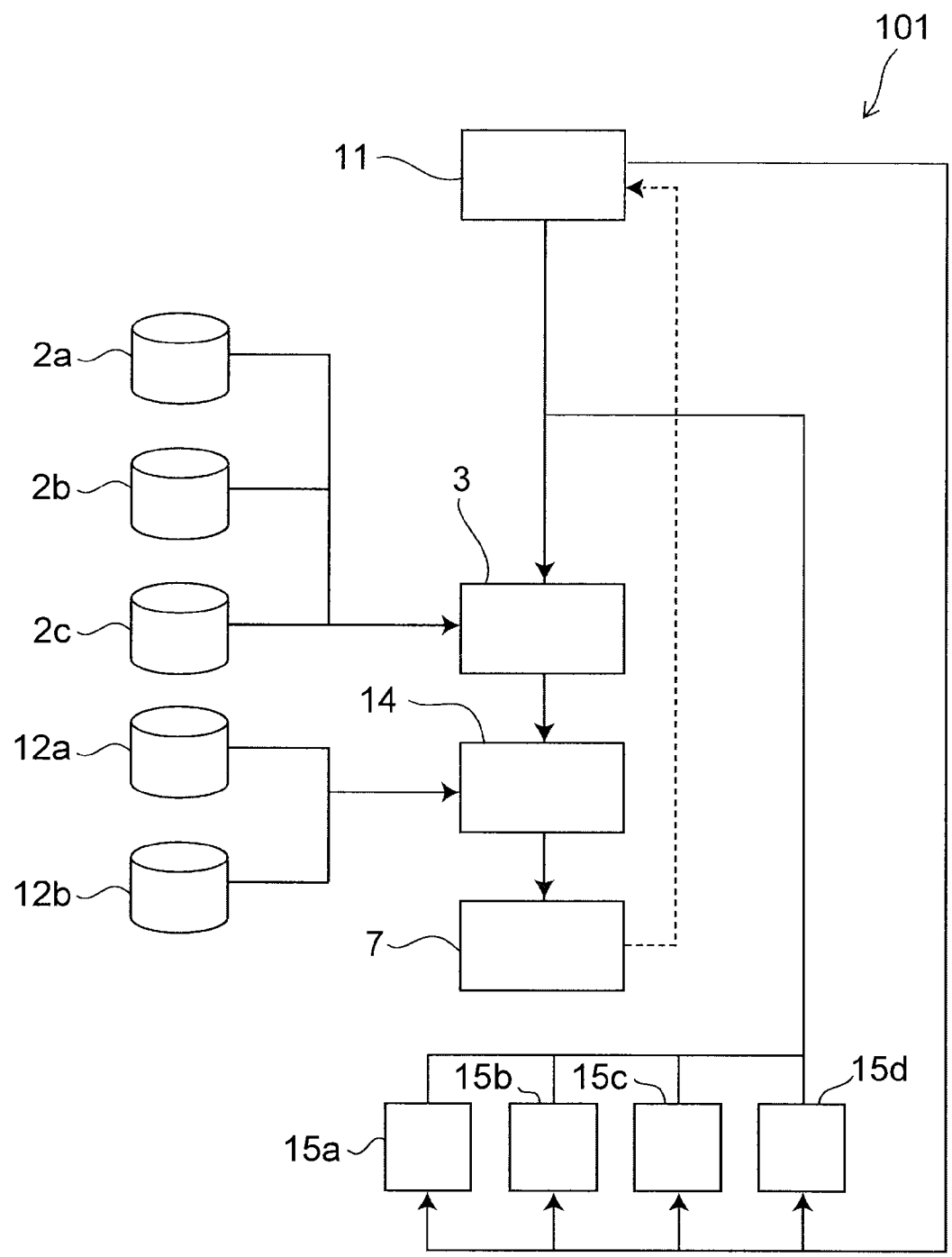
FIG. 3 is a block diagram showing a production support system according to a second embodiment.

FIG. 3 is a block diagram showing a production support system 101 according to a second embodiment.

As shown in FIG. 3, an input unit 11, the production information storage unit 2a, the manufacturing apparatus information storage unit 2b, the inspection/measurement apparatus information storage unit 2c, the planned lot number calculation unit 3, an inspection/measurement information storage unit 12a, an APC information storage unit 12b, a control mode calculation unit 14 (corresponding to an example of a second control mode calculation unit), the output unit 7, a first auxiliary unit 15a, a second auxiliary unit 15b, a third auxiliary unit 15c, and a fourth auxiliary unit 15d are provided in the production support system 101.

The input unit 11 may be similar to the input unit 1 described above.

However, the input unit 11 further includes a switch for selecting one selected from the first auxiliary unit 15a, the second auxiliary unit 15b, the third auxiliary unit 15c, and the fourth auxiliary unit 15d described below.

The inspection/measurement information storage unit 12a stores the data relating to the inspection result or measurement result. The data relating to the inspection result or measurement result is, for example, the dimensions, configuration, weight, reflected light intensity, light emission intensity, etc., of the product.

The inspection/measurement information storage unit 12a provides the stored data to the control mode calculation unit 14.

The APC information storage unit 12b stores the data relating to the APC calculation formula.

The APC information storage unit 12b provides the stored data to the control mode calculation unit 14.

The control mode calculation unit 14 calculates the fluctuation of the final quality for the cases where the feedback type/feedforward type combined APC is and is not performed from the data relating to the inspection result or measurement result (e.g., the dimensions of the product) extracted from the inspection/measurement information storage unit 12a, the data relating to the APC calculation formula extracted from the APC information storage unit 12b, and the number N of products to be subjected to the control of the final quality for each manufacturing apparatus (each processing chamber) determined by the planned lot number calculation unit 3.

For example, the control mode calculation unit 14 may repeatedly calculate the data for twelve months by shifting one month each time. The time period, etc., may be modified appropriately.

Then, the control mode calculation unit 14 calculates the number of products for which the fluctuation of the final quality is equal for the cases where the feedback type/feedforward type combined APC is and is not performed.

The number of products for which the fluctuation of the final quality is equal is provided to the output unit 7.

The output unit 7 displays the number of products for which the fluctuation of the final quality is equal as the time period in which it is appropriate not to perform the feedback type/feedforward type combined APC. In other words, the control mode calculation unit 14 performs a simulation using the actual data and suggests a selection of the appropriate control mode.

Also, the operator may select the following auxiliary functions from the input unit 11.

The first auxiliary unit 15a calculates a statistic (e.g., an average, fluctuation, a maximum value, a minimum value, etc.) for each manufacturing apparatus (each processing chamber) based on the data extracted from the manufacturing apparatus information storage unit 2b, the inspection/measurement apparatus information storage unit 2c, and the inspection/measurement information storage unit 12a. The calculation result may be displayed by the output unit 7, etc., as, for example, a matrix table including each manufacturing apparatus (each processing chamber), the inspection and/or measurement rate, and the number N of products to be subjected to the control of the final quality, a table that ranks the potential of the manufacturing apparatuses (the processing chambers) based on the statistics, etc.

The operator selects the manufacturing apparatuses (the processing chambers) suited to performing the APC from the data of the statistics relating to each manufacturing apparatus (each processing chamber) and inputs the selected data relating to the manufacturing apparatuses (the processing chambers) (e.g., the names of the manufacturing apparatuses (the processing chambers)) from the input unit 11.

The planned lot number calculation unit 3 calculates the number N of products to be subjected to the control of the final quality for the case where the input manufacturing apparatuses (processing chambers) are used based on the determined statistics.

The control mode calculation unit 14 calculates the fluctuation of the final quality for the cases where the feedback type/feedforward type combined APC is and is not performed for the case where the input manufacturing apparatuses (processing chambers) are used.

For example, the control mode calculation unit 14 may repeatedly calculate the data for twelve months by shifting one month each time. The time period, etc., may be modified appropriately.

Then, the control mode calculation unit 14 calculates the number of products for which the fluctuation of the final quality is equal for the cases where the feedback type/feedforward type combined APC is and is not performed.

The number of products for which the fluctuation of the final quality is equal is provided to the output unit 7.

The output unit 7 displays the number of products for which the fluctuation of the final quality is equal as the time period in which it is appropriate not to perform the feedback type/feedforward type combined APC.

The second auxiliary unit 15b calculates the moving average of the product for each manufacturing apparatus (each processing chamber) based on the data extracted from the manufacturing apparatus information storage unit 2b, the inspection/measurement apparatus information storage unit 2c, and the inspection/measurement information storage unit 12a.

Then, the second auxiliary unit 15b changes the moving average of the product.

The planned lot number calculation unit 3 calculates the number N of products to be subjected to the control of the final quality for each changed moving average of the product.

The control mode calculation unit 14 calculates the fluctuation of the final quality for the case where the feedback type/feedforward type combined APC is performed for each changed moving average of the product and calculates the moving average having a minimum fluctuation of the final quality.

For example, the control mode calculation unit 14 may repeatedly calculate the data for twelve months by shifting one month each time. The time period, etc., may be modified appropriately.

The calculation results are displayed by the output unit 7, etc.

The output unit 7 displays the moving average of the product having a minimum fluctuation of the final quality.

The third auxiliary unit 15c changes the correction coefficient (e.g., the correction coefficient of the feedback type APC) of the APC calculation formula stored in the APC information storage unit 12b.

The control mode calculation unit 14 calculates the fluctuation of the final quality for the case where the feedback type/feedforward type combined APC is performed for each of the changed correction coefficients and calculates the correction coefficient having a minimum fluctuation of the final quality.

For example, the control mode calculation unit 14 may repeatedly calculate the data for twelve months by shifting one month each time. The time period, etc., may be modified appropriately.

The calculation results are displayed by the output unit 7, etc.

The output unit 7 displays the correction coefficient of the APC calculation formula having a minimum fluctuation of the final quality.

The fourth auxiliary unit 15d provides data relating to group products to the output unit 7, etc.

The data relating to the group products is, for example, the product to be produced and other similar products.

For example, the data relating to the group products may be extracted from the data stored in the production information storage unit 2a.

The operator may input the data relating to the group products (e.g., the product name, etc.) from the input unit 11.

The planned lot number calculation unit 3 calculates the number N of products to be subjected to the control of the final quality for the input group product.

The control mode calculation unit 14 calculates the fluctuation of the final quality for the cases where the feedback type/feedforward type combined APC is and is not performed for the input group product.

The calculation results are displayed by the output unit 7, etc.

The output unit 7 displays the fluctuation of the final quality for the cases where the feedback type/feedforward type combined APC is and is not performed for the input group product.

As described above, the production support method according to the embodiment may include the following processes:

a process of calculating the planned production volume per manufacturing apparatus from the data relating to the production volume and the data relating to the manufacturing apparatuses;

a process of calculating the inspection and/or measurement rate from the data relating to the production volume and the data relating to the inspection apparatuses or measurement apparatuses;

a process of calculating the number of products to be subjected to the control of the final quality from the planned production volume per manufacturing apparatus and the inspection and/or measurement rate; and a process of calculating the fluctuation of the final quality for the cases where the feedback type/feedforward type combined APC is and is not performed from the data relating to the inspection result or measurement result, the data relating to the APC calculation formula, and the number of products to be subjected to the control of the final quality.

The content of each of the processes may be similar to those described above. Therefore, a description of the content of each of the processes is omitted.

Third Embodiment

A production support program according to the embodiment will now be described.

The production support program according to the embodiment causes a computer to execute the production support method described above.

To execute the series of production support, the production support program according to the embodiment is stored in, for example, a not-shown program storage unit provided in the production support systems 100 and 101. For example, the production support program may be stored in the not-shown program storage unit via a not-shown recording medium or may be stored in the not-shown program storage unit via a MES (Manufacturing Execution System)-type LAN (Local Area Network), etc.

Then, by executing the program, the extractions and/or calculations of the planned lot number calculation unit 3, the control mode calculation unit 5, the control mode calculation unit 14, etc., described above are executed.

The production support program may cause the following to be executed:

calculating the planned production volume per manufacturing apparatus from the data relating to the production volume and the data relating to the manufacturing apparatuses;

calculating the inspection and/or measurement rate from the data relating to the production volume and the data relating to the inspection apparatuses or measurement apparatuses;

calculating the number of products to be subjected to the control of the final quality from the planned production volume per manufacturing apparatus and the inspection and/or measurement rate; and calculating the appropriate control mode from the number of products to be subjected to the control of the final quality, the relationship between the fluctuation of the final quality and the number of products when performing the predetermined feedback type/feedforward type combined APC, the fluctuation of the final quality when performing the feedforward type APC, and the fluctuation of the final quality when not performing the feedback type/feedforward type combined APC.

Also, the production support program may cause the following to be executed:

calculating the planned production volume per manufacturing apparatus from the data relating to the production volume and the data relating to the manufacturing apparatuses;

calculating the inspection and/or measurement rate from the data relating to the production volume and the data relating to the inspection apparatuses or measurement apparatuses;

calculating the number of products to be subjected to the control of the final quality from the planned production volume per manufacturing apparatus and the inspection and/or measurement rate; and calculating the fluctuation of the final quality for the cases where the feedback type/feedforward type combined APC is and is not performed from the data relating to the inspection result or measurement result, the data relating to the APC calculation formula, and the number of products to be subjected to the control of the final quality.

Although the method that is executed based on the production support program may be executed sequentially according to the order described above, the method may not always be executed sequentially and may be executed in parallel or selectively.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A production support system, comprising:
   a production information storage unit configured to store data relating to a production volume;
   a manufacturing apparatus information storage unit configured to store data relating to a manufacturing apparatus;
   an inspection/measurement apparatus information storage unit configured to store data relating to an inspection apparatus or measurement apparatus;
   a planned lot number calculation unit configured to
      calculate a planned production volume per manufacturing apparatus from the data relating to the production volume and the data relating to the manufacturing apparatus,
      calculate an inspection and/or measurement rate from the data relating to the production volume and the data relating to the inspection apparatus or measurement apparatus, and
      calculate a number of products to be subjected to control of the final quality from the planned production volume per manufacturing apparatus and the inspection and/or measurement rate; and
   a first control mode calculation unit configured to select an appropriate control mode from
      the number of products to be subjected to the control of the final quality,
      a relationship between fluctuation of the final quality and a number of products when performing a predetermined feedback type/feedforward type combined APC,
      a first fluctuation of the final quality when performing a feedforward type APC, and
      a second fluctuation of the final quality when not performing the feedback type/feedforward type combined APC,
   the first control mode calculation unit calculating a first number of products and a second number of products, the first number of products being a number of products corresponding to a same fluctuation as the first fluctuation in the relationship between fluctuation of the final quality and the number of products when performing the predetermined feedback type/feedforward type combined APC, the second number of products being a number of products corresponding to a same fluctuation as the second fluctuation in the relationship between fluctuation of the final quality and the number of products when performing the predetermined feedback type/feedforward type combined APC,
   when the number of products to be subjected to the control of the final quality being between 0 and the second number of products, the first control mode calculation unit selecting not performing feedback type/feedforward type combined APC,
   when the number of products to be subjected to the control of the final quality being between the second number of products and the first number of products, the first control mode calculation unit selecting performing feedforward type APC, and
   when the number of products to be subjected to the control of the final quality being exceeding the first number of products, the first control mode calculation unit selecting performing feedback type/feedforward type combined APC.

2. The system according to claim 1, further comprising a control information calculation unit configured to determine an effect of the APC from
   the number of products to be subjected to the control of the final quality and
   the relationship between the fluctuation of the final quality and the number of products when performing the predetermined feedback type/feedforward type combined APC.

* * * * *